US009618325B2

(12) United States Patent
Brown et al.

(10) Patent No.: US 9,618,325 B2
(45) Date of Patent: Apr. 11, 2017

(54) OPTICAL COHERENCE TOMOGRAPHY IMAGING SYSTEMS AND METHODS

(71) Applicants: William Brown, Durham, NC (US); Michael Crose, Durham, NC (US)

(72) Inventors: William Brown, Durham, NC (US); Michael Crose, Durham, NC (US)

(73) Assignee: Lumedica Inc., Durham, NC (US)

( * ) Notice: Subject to any disclaimer, the term of this patent is extended or adjusted under 35 U.S.C. 154(b) by 0 days.

(21) Appl. No.: 14/469,474

(22) Filed: Aug. 26, 2014

(65) Prior Publication Data

US 2015/0055137 A1 Feb. 26, 2015

Related U.S. Application Data

(60) Provisional application No. 61/869,991, filed on Aug. 26, 2013.

(51) Int. Cl.
*G01B 9/02* (2006.01)

(52) U.S. Cl.
CPC ....... *G01B 9/02091* (2013.01); *G01B 9/0205* (2013.01); *G01B 9/02044* (2013.01); *G01B 9/02054* (2013.01)

(58) Field of Classification Search
CPC .............. G01B 9/02091; G01B 9/0205; G01B 9/02054
See application file for complete search history.

(56) References Cited

U.S. PATENT DOCUMENTS

| 8,064,989 | B2 | 11/2011 | Brown et al. | |
|---|---|---|---|---|
| 2004/0076390 | A1* | 4/2004 | Dong Yang | A61B 1/00096 385/116 |
| 2004/0239943 | A1* | 12/2004 | Izatt | G01N 21/4795 356/479 |
| 2007/0160325 | A1* | 7/2007 | Son | G01J 3/02 385/37 |
| 2008/0007733 | A1* | 1/2008 | Marks et al. | 356/477 |
| 2008/0062429 | A1 | 3/2008 | Liang et al. | |
| 2008/0204711 | A1* | 8/2008 | Harrison et al. | 356/51 |
| 2009/0263040 | A1* | 10/2009 | Rolland et al. | 382/255 |
| 2010/0081873 | A1* | 4/2010 | Tanimura et al. | 600/109 |
| 2011/0130652 | A1* | 6/2011 | Boppart et al. | 600/425 |
| 2011/0149245 | A1* | 6/2011 | Barth | A61B 3/1005 351/215 |
| 2012/0002919 | A1* | 1/2012 | Liu | G02B 6/32 385/27 |

(Continued)

OTHER PUBLICATIONS

International Preliminary Report on Patentability dated Mar. 1, 2016 for PCT application PCT/US2014/052777.

(Continued)

*Primary Examiner* — Kara E Geisel
*Assistant Examiner* — Shawn Decenzo
(74) *Attorney, Agent, or Firm* — Olive Law Group, PLLC

(57) ABSTRACT

Optical coherence tomography imaging systems and methods are disclosed. According to an aspect, an optical coherence tomography imaging system includes a scanner configured to obtain images and to convert the images to electrical signals. The system also includes a computing device comprising an OCT module configured to receive the electrical signals, to apply an OCT imaging technique, and to generate imaging data.

21 Claims, 16 Drawing Sheets

(56) References Cited

U.S. PATENT DOCUMENTS

| | | | |
|---|---|---|---|
| 2012/0176615 A1* | 7/2012 | Brown | G01J 3/2803 356/328 |
| 2012/0320380 A1* | 12/2012 | Schonleber | G01B 11/0625 356/479 |
| 2013/0027711 A1* | 1/2013 | Hajian | G01J 3/0294 356/451 |
| 2013/0120710 A1 | 5/2013 | Buckland et al. | |
| 2013/0162978 A1 | 6/2013 | Yazdanfar et al. | |
| 2015/0216408 A1* | 8/2015 | Brown | A61B 3/1015 351/206 |

OTHER PUBLICATIONS

Written Opinion of the Internal Searching Authority dated Dec. 26, 2014 for PCT Application No. PCT/US2014/052777.

* cited by examiner

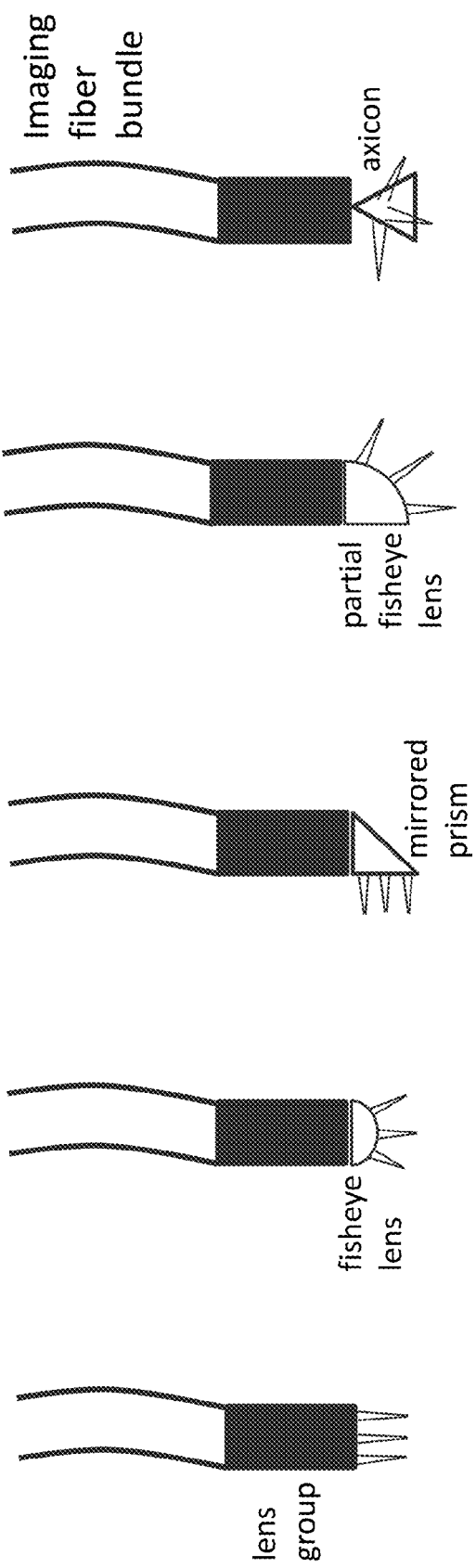

OPTICAL COHERENCE TOMOGRAPHY IMAGING SYSTEMS AND METHODS

CROSS REFERENCE TO RELATED APPLICATION

This application claims the benefit of and priority to U.S. Provisional Patent Application No. 61/869,991, filed Aug. 26, 2013 and titled OPTICAL COHERENCE TOMOGRAPHY IMAGING SYSTEMS AND METHODS, the content of which is incorporated by reference in its entirety.

TECHNICAL FIELD

The present subject matter relates to imaging. More particularly, the present subject matter relates to optical coherence tomography (OCT) imaging systems and methods.

BACKGROUND

OCT is an imaging modality that can be thought of as the optical analog to ultrasound. Focused light illuminates a sample and backscattered light is collected and by use of interferometry, depth gated as to where it backscattered from. This allows one to see into samples in a similar fashion to ultrasound. To build up a 2 or 3 dimensional image, the light beam is typically scanned across the sample in one or two directions. OCT is ideally positioned for imaging samples where 1 to 5 millimeters of penetration is needed with resolution of 2 to 15 microns.

OCT is widely used in an increasing number of applications including, but not limited to, medical (e.g., ophthalmology, intravascular, oncology, dermatology, neurology, gastroenterology, ear, nose and throat (ENT)), biomedical research (developmental biology, small animal imaging, biofilm imaging, and tissue engineering), and industrial (e.g., carbon fiber composites, art inspection, multilayer thin film thickness, plastic seal monitoring, contact lens production, and coating qualification). Lowering the system price will both increase the usage in these areas and open up new areas for application.

The first OCT systems used a time domain architecture where depth scanning was achieved by physically moving a mirror in the reference arm. In early 2000s, the Fourier domain approach to OCT was invented with two implementations, spectral domain OCT where a broadband light source is used in conjunction with a spectrometer and swept source OCT where a laser is swept in wavelength and different wavelengths are sampled at different times. Fourier domain OCT architectures have a SNR advantage over time domain ones that is proportional to the number of pixels in the spectrometer or the number of samples in one laser sweep. FD-OCT systems have now displaced time domain systems in most clinical applications although there are a few industrial applications where time domain OCT is still prevalent.

In spectral domain OCT system architecture there are four critical components that set the performance: the light source, the grating and camera inside the spectrometer, and the scanner. Even though OCT has commercially exploded in the last decade, it is not yet a large enough market by itself to drive component development. Therefore, the advanced components used in most OCT systems were originally developed for other applications. For example, most cameras used in OCT spectrometers are line scan cameras designed for machine vision applications. These cameras have very high line rates (up to 140,000 lines/second), but have short pixel dimensions since they are used to image items passing by quickly on conveyor belts such that the translation of the object provides the 2nd dimension for imaging. When used in spectrometers, these cameras are difficult to align and maintain since spectrally dispersed light forms a line that is approximately 20 mm wide by 6-7 microns tall and the line scan array is 20 millimeters wide by 20 microns tall. These cameras are also fairly expensive with even low end models costing at least $2,000.

Moving beyond the research and industrial markets, there is tremendous opportunity for low cost OCT in clinical areas, such as at the point of care and for clinical care in the developing world, but the regulatory and manufacturing requirements for a clinical system require more capital to address. Some potential clinical applications include a low cost retinal scanner that could be widely deployed both in the United States for imaging of patients with diabetic retinopathy, glaucoma, or macular degeneration or use in the developing world for retinal screening of newborns and infants. Regulatory overhead and more sophisticated software may increase the cost of a clinical unit, but it could still be greater than $12,000.

For at least the aforementioned reasons, there is a continuing need for low cost OCT imaging systems and techniques that provide high quality images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are low cost OCT imaging systems for imaging research, industrial, and clinical samples. In one or more aspects, advantage is taken of several components that are either new or are coming down in cost because they are used in high volumes in other applications. In particular, the CMOS line scan array can be used in barcode reading, fingerprinting and edge detection; all high volume, but low cost applications. Likewise, a steerable liquid lenses can be used for scanning and have been designed for use in cell phone cameras as a motion compensation mechanism. As the user moves the camera up and down (or side to side), the lens may steer so that the sensor is still looking at the same target.

Further, the present subject matter covers a very low cost spectral domain optical coherence tomography system. The target system price will be greater than 3 times less expensive than any currently available research OCT system while providing system performance comparable to other entry level OCT imaging systems. By breaking the $10,000 system barrier, a tool is provided that will be accessible to most research labs and will not be confined to shared resource labs. One implementation can target research and industrial applications where low cost is an advantage and system sales do not require regulatory approval.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIGS. 17A-17E illustrate diagrams of example probe tip geometries and optics in accordance with embodiments of the present subject matter.

DETAILED DESCRIPTION

Figure 1:
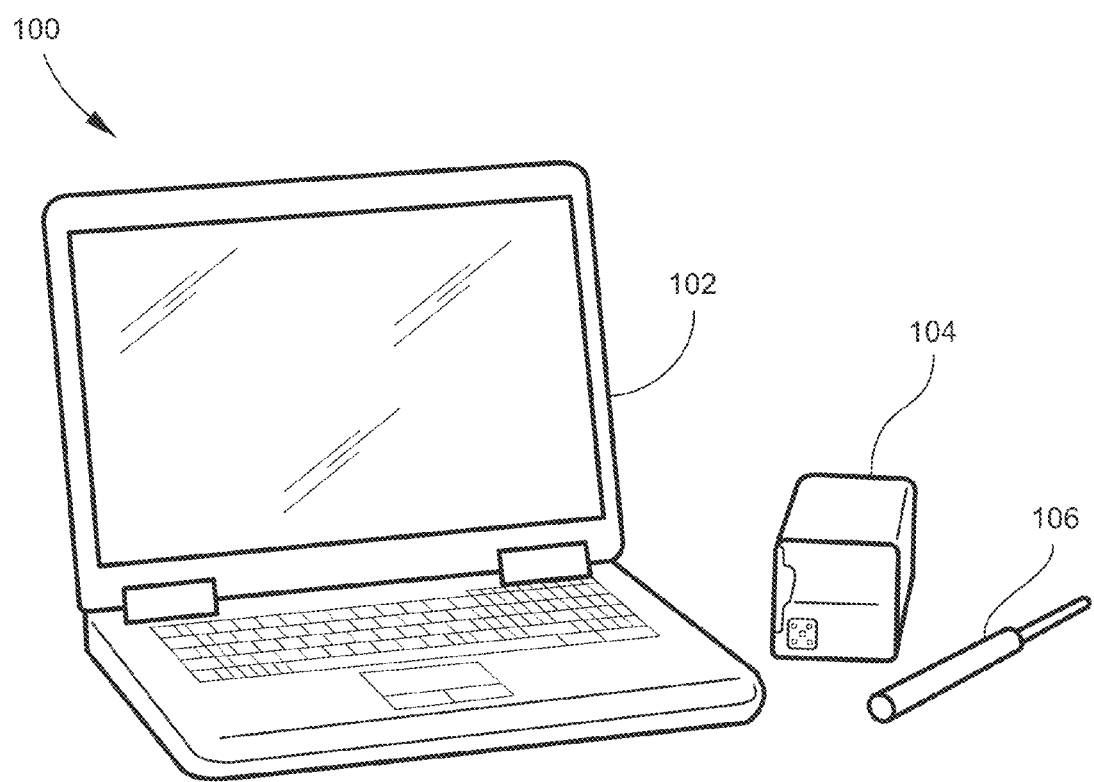
FIG. 1 is a perspective view of a OCT imaging system including a computer, an OCT engine, and a wand scanner according to embodiments of the present subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. FIG. 1 is a perspective view of a OCT imaging system 100 including a computer 102, an OCT engine 104, and a wand scanner 106 according to embodiments of the present subject matter. Referring to FIG. 1, the computer 102 may be any suitable computing device having one or more processors and memory. The memory may be configured with instructions for implementation by the processor(s) for carrying out the function described herein. As an alternative, for example, the computing device may include suitable hardware, software, firmware, or combinations thereof for carrying out the functions described herein.

The computer 102 may be communicatively connected to the OCT engine 104. The OCT engine 104 may be communicatively connected to the wand scanner 106. The OCT engine 104 and the scanner 106 may be any suitable type of equipment configured to obtain images and to convert the images to electrical signals representative of the images. The wand scanner 106 may be shaped and sized for holding by a person. For example, the wand scanner 106 may be configured as any suitable handheld device. The computer 102 may be configured to receive the electrical signals, to apply an OCT imaging technique, and to generate imaging data. The computer 102 may display images corresponding to the imaging data on its display.

The computer 102, OCT engine 104, and scanner 106 may suitably communicate with each other. In this example, the components communicate with each other via a suitable wireless communications technique such as Bluetooth communications. Alternatively, the components may communicate via a wired communications technique.

System Architecture

Figure 2:
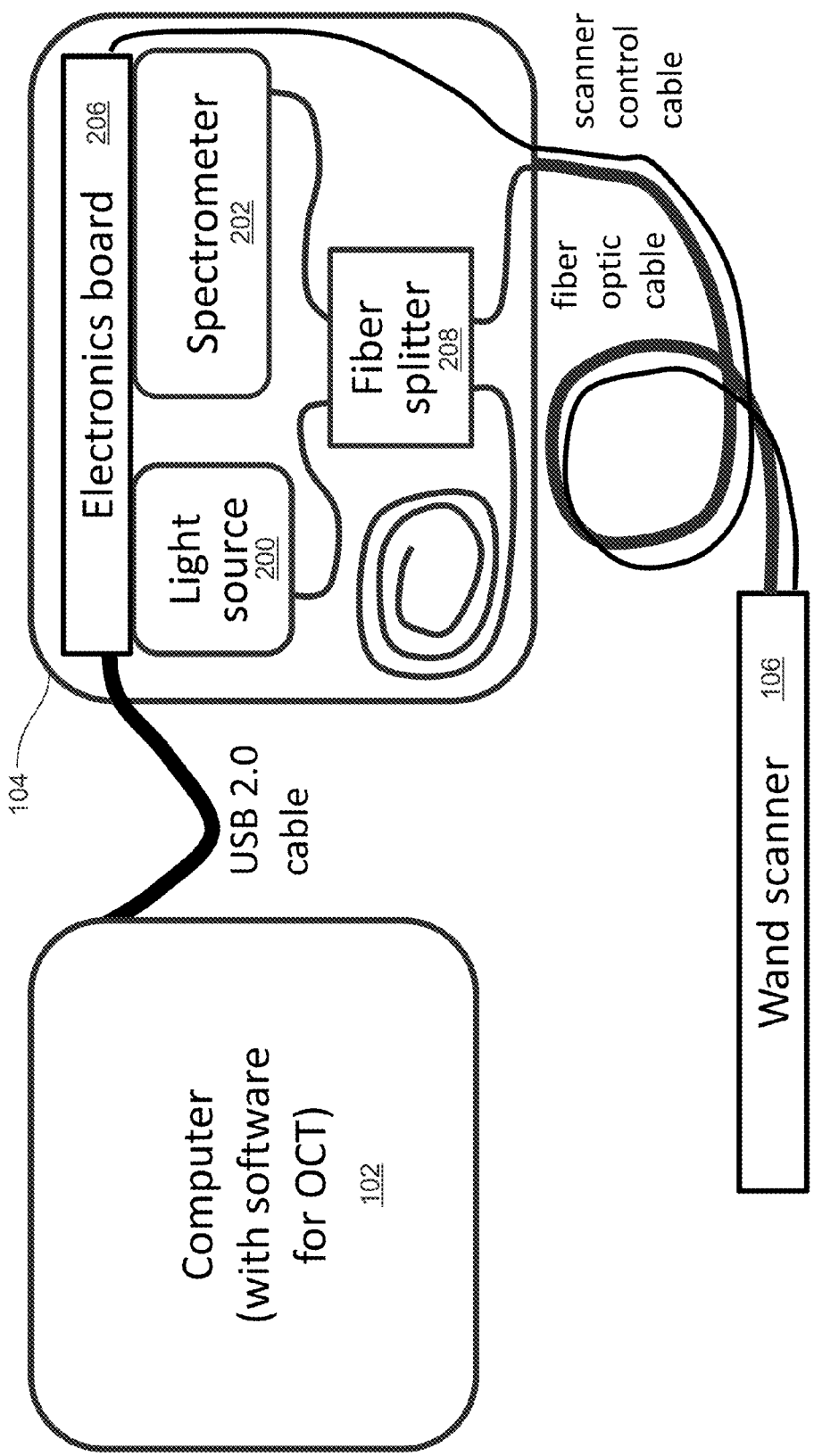
FIG. 2 is a block diagram of an example architecture for the OCT imaging system 100 in accordance with embodiments of the present subject matter.

FIG. 2 illustrates a block diagram of an example architecture for the OCT imaging system 100 in accordance with embodiments of the present subject matter. Referring to FIG. 2, the system 100 may include three major subsystems: a computer 102 with software; an OCT engine 104, and a scanner 106. The computer 102 may be any suitable type of computer. For example, it may be a computer using the Android operating system, a widely used and available operating system from multiple hardware manufacturers including Samsung, HP, and others. The OCT software may control the rest of the OCT system, collect raw data from the spectrometer and transform it into imaging data, store and retrieve OCT images and/or raw data, and provide a user interface for the system. Other operating systems or computers may be used including embedded processor, systems on modules or system on chips.

The OCT engine 104 may contain a light source 200, a spectrometer 202 and interferometer, and an electronics control board 206. The OCT engine 104 may also include a fiber splitter 208. The light source 200 may be a superluminescent diode (SLD) or other broadband light source. The spectrometer 202 may be the low cost spectrometer as described in further detail herein or another suitable spectrometer. The interferometer may be a fiber coupler or other suitable implementation.

The scanner 106 may be a wand scanner or another suitable scanner. The wand scanner is described in further detail herein or may be another suitable scanner. The scanner 106 may include one or more steerable liquid lens. The scanner 106 may contain some controls for path length matching, polarization matching or control and power control.

Figure 3:
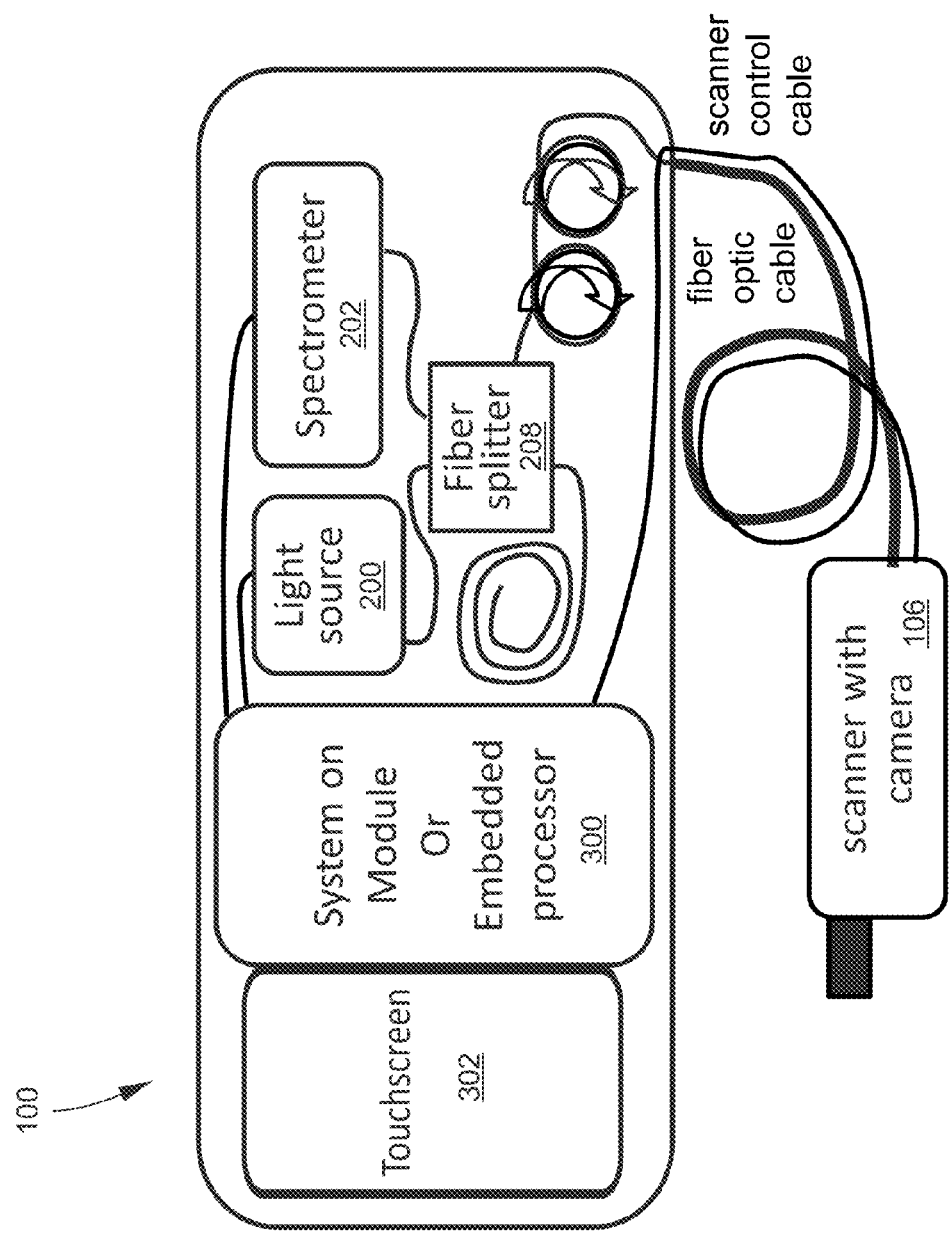
FIG. 3 is a block diagram of an example architecture for another OCT imaging system in accordance with embodiments of the present subject matter.
Figure 4:
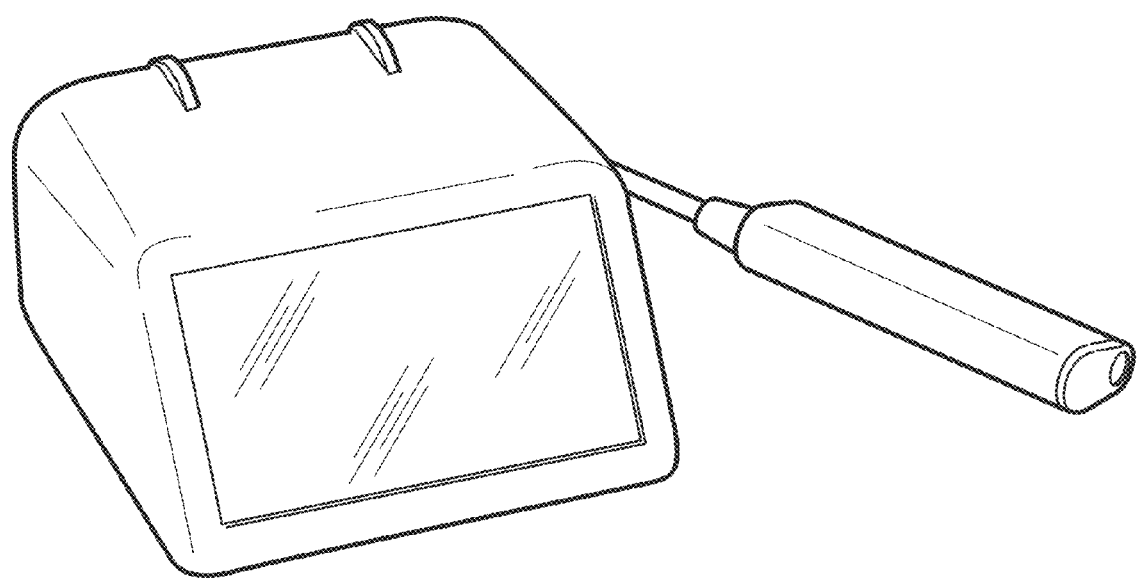
FIG. 4 is a perspective view of an OCT imaging system in accordance with embodiments of the present subject matter.

As embedded processors have become more powerful, it is now possible to replace the external computer with an embedded processor inside of the OCT engine 104. For example, FIG. 3 illustrates a block diagram of an example architecture for another OCT imaging system 100 in accordance with embodiments of the present subject matter. Referring to FIG. 3, a system on module (SoM) 300 is used in place of a computer. FIG. 4 illustrates a perspective view of an OCT imaging system 100 in accordance with embodiments of the present subject matter. One or more electronics boards may be configured to implement functions of controlling the scanner, the light source 200, the spectrometer 202, collecting data from the spectrometer 202, and processing that data to generate OCT images. Example embedded processors include, but are not limited to, the Variscite VAR-SOM-SD600 CPU, which uses the Qualcomm Snapdragon 600. The system 100 may include an input/output (I/O) on the engine, for example using a touchscreen 302. In addition or as an alternative, the engine may communicate with an external device via wireless communication such as Bluetooth, WI-FI, or other suitable wireless technique. As part of the system, there may be one or more applications that reside on a tablet computer or smartphone and communicate with the OCT engine. These applications may allow control of the engine and the scanner and may receive and display OCT images from the OCT engine. Further, the application may subsequently communicate with a central repository via wireless or cellular communication to transmit and store the OCT images for subsequent imaging, analysis, display, or as part of an electronic medical record (EMR).

Note that one of the advantages of this approach is low electrical power consumption. By using an uncooled SLD (i.e., one without a TEC) and a CMOS linescan array, it is possible to get the power consumption of the engine below 5W. The embedded processor can consume additional power, but the entire system could be below 10W. This can enable the system to operate for several hours on a laptop battery or similar battery. In turn, the system 100 can now be used in a place where there is no available wall power or in an environment where it is moved from room to room, such as a doctor's clinic, without needing to be plugged into wall power in every room.

In OCT, there are several physical properties that need some degree of control for acceptable interferometry and hence OCT signal to noise. Examples include, but are not limited to, pathlength matching, polarization matching, and power control. For pathlength matching, the two arms of the interferometer may have the same optical pathlength within a fraction of a millimeter in order for interference fringes to be detected with the spectrometer. In this system, coarse pathlength matching (within +/−3 mm) may be achieved by controlling the length of the reference arm fiber during manufacture. Fine control may be achieved within the wand scanner by optimizing the focus of the liquid lenses.

In accordance with embodiments, one or both of the scanner and computing device may be configured to polarization control. For example, polarization matching may be accomplished by incorporating a plastic film quarter wave plate in the wand scanner that can be rotated to optimize the OCT signal. Even though two wave plates are typically needed for best optimization, a single wave plate may be used as a cost saving measure that can provide enough control to ensure that the polarizations in the two arms are not orthogonal. Alternately, polarization matching may be accomplished by using coils of fiber that are then rotated. Different numbers of coils, one through four, approximate different wave plates depending on the wavelength of light and the type of fiber. Reasonable polarization control can often be obtained with two coils where the first has a single loop and the second has two loops of fiber.

Power control may be accomplished by setting the reflection level from the fiber tip in the reference arm. Initial design indicates that the fiber to air interface which will result reflection about 4% of the light will be adequate. The light source may generate approximately 2 mW of power, giving 1 mW in the reference arm after the 50/50 splitter, 40 micro W returning, and 20 microW at the linescan array. Additional losses can drop the power level close to the 10 microW estimated for filling the linescan array. The integration time of the linescan array may then be adjusted to provide fine tuning of the amount of light collected in one integration time. In particular, the integration time may be shortened so that the light does not saturated the detector above a certain level.

Polarization Sensitive System

In accordance with embodiments, OCT is polarization sensitive OCT where the interferometer works in both polarizations and signals are collected and processed for both polarizations. By collecting two polarizations, it is possible to image the birefringence (or polarization dependent index of refraction) of the sample. Additional information may be provided about the sample such as stresses in a molded plastic part or tissue characteristics in animal or humans. Polarization sensitive spectral domain OCT may require a more sophisticated spectrometer and may require additional optics elements in the OCT engine or wand scanner. Some optics, such as the waveplate, may be removed, since the system may not need to be optimized for a single polarization since multiple polarizations are present and provide useful imaging information.

The polarization sensitive spectrometer may be implemented in a variety of ways including, but not limited to, a multilinescan array with optics for spatially separating the polarizations or two or more linescan arrays with optics to separate the polarizations so that one polarization is directed to one of the linescan arrays and the other polarization is directed to another linescan array. The polarizations between A-scans may be changed so that one A-scan has one polarization and a subsequent A-scan has a different polarization. This may slow down the overall A-scan rate, but that may be acceptable in a low cost system.

Figure 5:
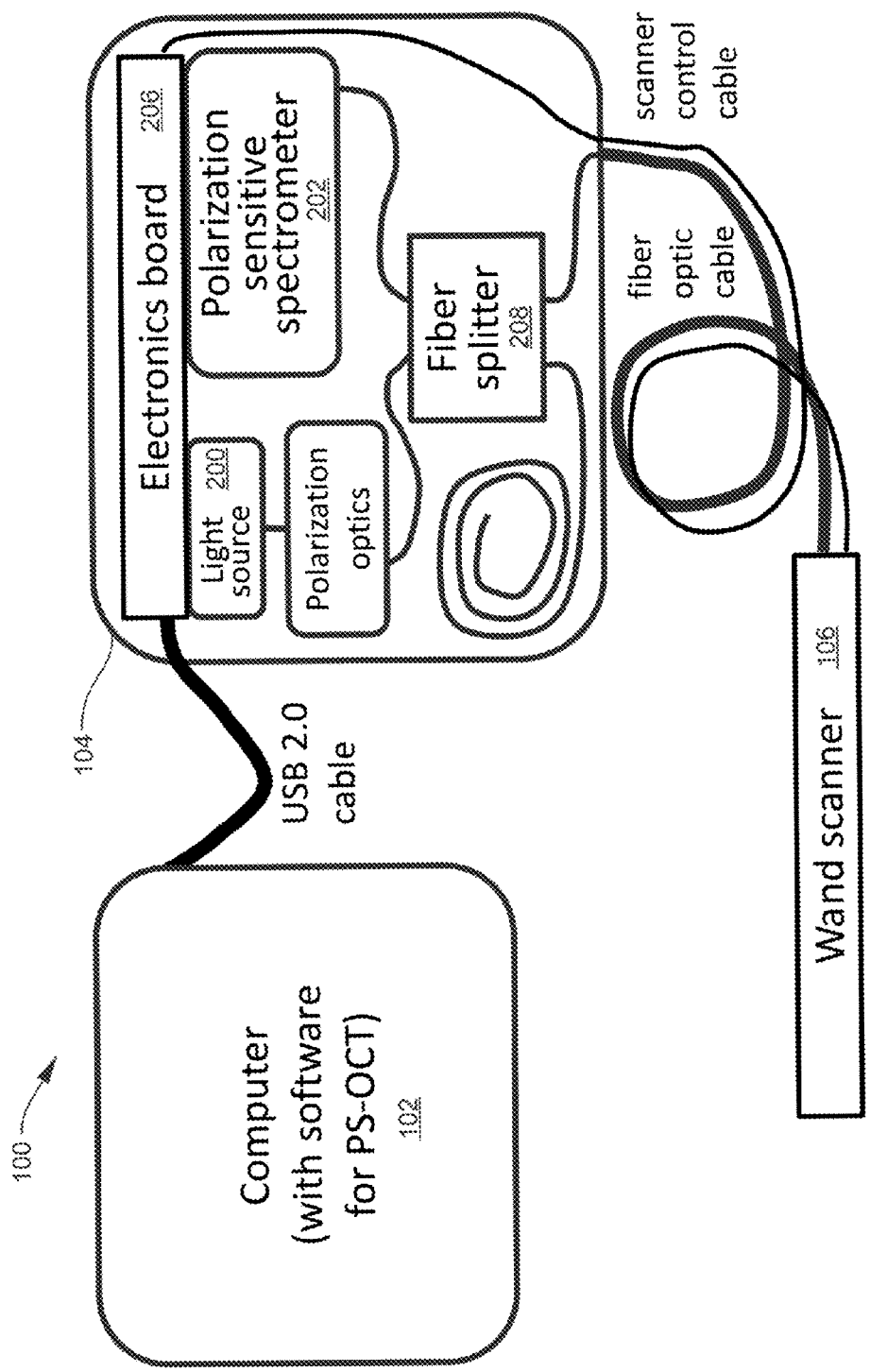
FIG. 5 is a block diagram of another example architecture for an OCT system in accordance with embodiments of the present subject matter.

The wand scanner 106 may implement PS-OCT. As an example, a relatively low cost version of PS-OCT may be implemented that remains within the cost structure of this low cost OCT while providing additional information about the sample. One potential implementation of PS-OCT is shown in FIG. 5, which illustrates a block diagram of another example architecture for an OCT system 100 in accordance with embodiments of the present subject matter. Referring to FIG. 5, the system 100 is a polarization sensitive OCT system with a wand scanner. Here, the low cost spectrometer has been replaced by a polarization sensitive spectrometer 202. There may be additional polarization optics between the light source 200 and the fiber splitter 208 (interferometer). The system 100 may include polarization optics in the OCT engine 104. The spectrometer 202 may have sensitivity to polarization, and this may be implemented by any suitable technique. The polarization sensitive spectrometer 202 may include an optical depolarizer, since many broadband light sources such as SLDs are fairly polarized, depolarizing may be useful to get the optical power closer to equal in the two polarizations. In an example, a 50:50 power split may be provided between the two polarizations. Alternatively, for example, any other suitable power split may be provided.

Swept Source Optical Coherence Tomography

Although much of the present disclosure describes spectral domain OCT systems, several embodiments disclosed herein may be suitable with swept source OCT systems. In swept source OCT, a tunable laser and one or more photodiodes can be used in the OCT engine 104 in place of the broadband light source 200 and the spectrometer 202. The system performance may be the same or nearly so, but now the spectral information can be collected in a time sequenced fashion instead of simultaneously as in spectral domain OCT.

In particular, the steerable lens based wand scanner can work quite well with a swept source OCT engine. The internal engine components can be changed out for a swept source implementation, and the wand scanner construction and operation can be very similar to what is described herein. The optimization of pathlength matching, polarization matching, and power control may be similar to the spectral domain OCT approach.

Low Cost Wand Scanner Based on Steerable Liquid Lenses

OCT systems can achieve optical scanning by using either a pair of galvo mirrors or a MEMS mirror to direct the beam across the sample. As an alternative, liquid lenses may be utilized and such lenses have been available for some time and are now produced in steerable versions. Lenses that may be used with systems described herein include, but are not limited to, the Baltic 617 made available by Varioptic. The focus range for these lenses is −5 diopters to +15 diopters with a tilt range of +/−0.6 degrees. The tangent of 0.6 degrees is 0.01 which when multiplied by the distance between the lenses and the sample can give half the lateral scan range. For a 100 millimeter spacing between the lens and the sample, the scan range can be 2 millimeters. This may be too small for practical imaging, so two of these may be stacked to generate a full scan range of 4 millimeters. Maximum speed for existing lenses is 10 Hz. The lenses can tilt the beam in any direction, so linear scans, circular scans, and eventually 3D scans may be executed while simultaneously adjusting focus. Control of the liquid lenses can be accomplished via a scanner control cable to carry the voltages for driving two axes on each of the two lenses where each lens requires 50 mW of power for scanning Alternately, the voltages may be generated in the wand scanner and control signals sent over the cable via digital communication. More than two steerable lenses may be used if needed. For steerable lenses that scan in two directions, a scan may be utilized that is along the diagonal and is thus longer than a scan that is aligned with one of scan axis. In the previous example, the total scan length can be increased by a factor of square root of by using the diagonal and thus giving a total scan range of 5.6 mm.

Figure 6:
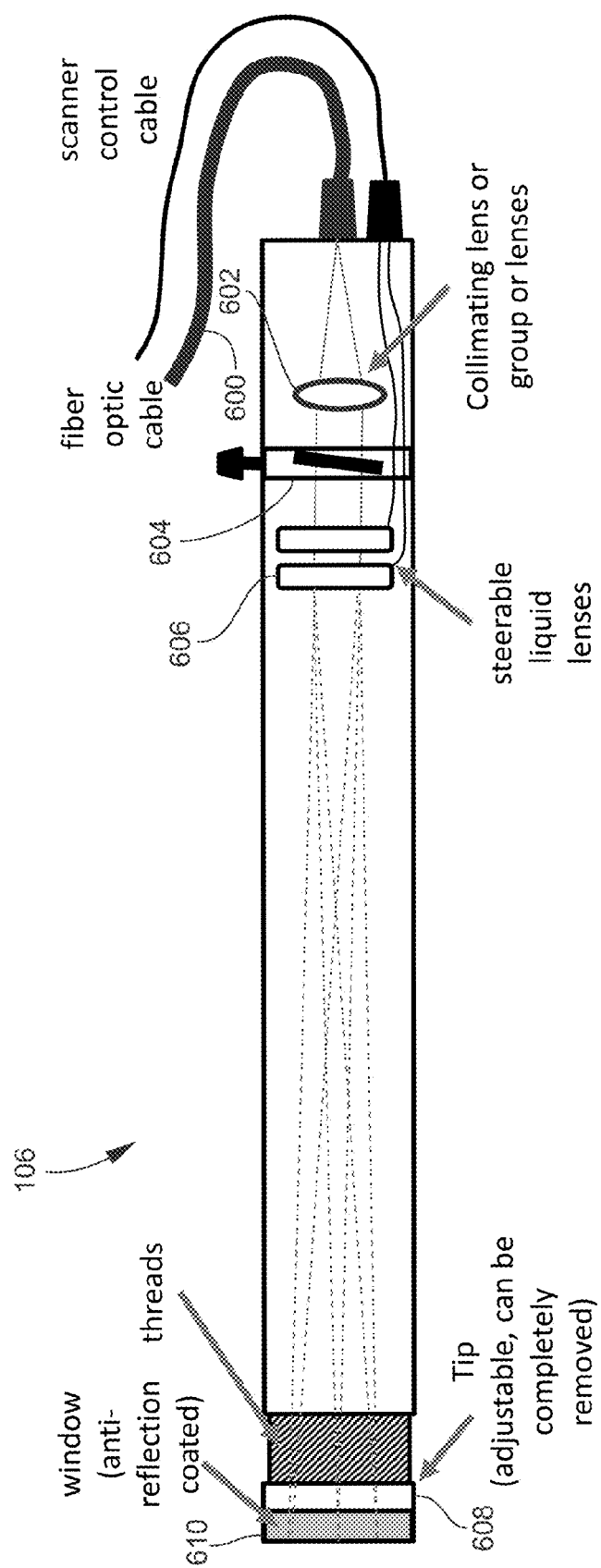
FIG. 6 is a diagram of an example wand scanner in accordance with embodiments of the present subject matter.

FIG. 6 illustrates a diagram of an example wand scanner 106 in accordance with embodiments of the present subject matter. Referring to FIG. 6, the wand scanner 106 may include and be configured to operate steerable liquid lenses. Light may enter the scanner 106 on the right side from an input fiber 600. A lens 602 may receive the light and may be configured to collimate the light. The lens 602 may have a focal length of ~16 millimeters or any other suitable length or configuration. The collimated light passes through a rotatable waveplate 604 and then through a pair of steerable liquid lenses 606. The light is focused at the distal tip 608 of the scanner 106. The scanner 106 may include a removable tip 608 with an anti-reflection coated window 610 on a threaded insert to thereby allowing fine adjustment of the pathlength matching between the reference arm in the OCT engine and the scanner. The liquid lenses can allow adjustment of focus over a few millimeter range. For non-contact imaging, the tip 608 can be completely unscrewed and fine optimization can do accomplished using only the focus control of the liquid lenses 606. The scanner 106 can also be mounted to a translation stage that holds it vertically for scanning samples in a bench top configuration. Using a stand can also minimize movement between the scanner 106 and the sample for either 3D imaging or averaging of many B-scans to produce higher SNR images, if desired.

The rotatable wave plate 604 may allow for polarization matching between the reference arm in the engine and the sample arm. Since the fiber in the engine can be fixed in place, the polarization for the reference arm may not change significantly over time. However, the fiber from the engine to the wand scanner 106 can be moved as the scanner 106 is manipulated during use. Therefore, some form of polarization compensation may be needed. For good polarization matching, one may need both a quarter wave plate and a half wave plate. In this case, perfect polarization matching may not be achieved by the system, but instead a limited degree of control is offered. This can ensure that the device avoids the case where the polarizations of the sample and reference arms are orthogonal to each other and the interference fringe goes to zero. A single rotatable wave plate can allow the polarization of the sample arm to be shifted and provide sufficient control to avoid the crossed polarization condition. The user can rotate the wave plate 604 while looking at the OCT image to optimize the signal strength of the image. In an alternative example, a second wave plate can be utilized by integration into the wand scanner 106.

The liquid lenses described herein are steerable lenses, although any suitable type may be used. Like most new products based on new technologies, performance can be expected to improve over time. Improvement may occur in any of the performance attributes of the liquid lenses 606. As an example, scan range can be improved by use of the Baltic 617, which has a steerable range of +/−0.6 degrees. This may increase as this product is improved and other versions of this technology come on the market. For OCT, larger scan range is better, it would be ideal if a single lens could scan +/−10 degrees or more. As another example, it is noted that the scan speed of the Baltic 617 is 10 Hz. Many ophthalmic OCT systems have B-scan rates of 30 to 40 Hz and there are research systems running well over 100 Hz.

Single Steerable Lens

Figure 7:
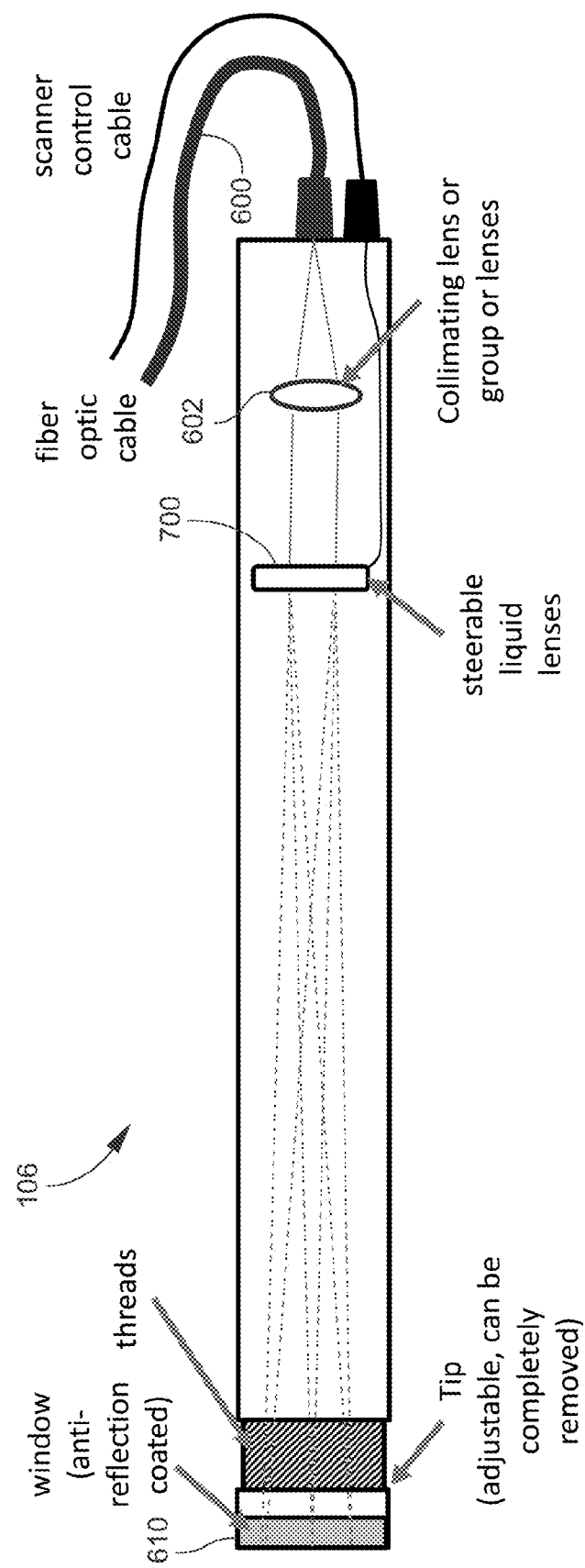
FIG. 7 is a diagram of an example of a wand scanner in which a single steerable lens is used in conjunction with a collimating lens to scan the beam across the sample in accordance with embodiments of the present subject matter.

As noted, the steerable scan range of the liquid lens may increase over time. Alternately, there may be OCT applications where a smaller scan range is sufficient. In either of these cases, a wand scanner can be provided with a single steerable lens instead of multiple lenses. FIG. 7 illustrates a diagram of an example of a wand scanner in which a single steerable lens 700 is used in conjunction with a collimating lens 602 to scan the beam across the sample in accordance with embodiments of the present subject matter.

Wand Scanner with Additional Lenses for More Telecentric Scanning

Embodiments described hereinabove may have a curved focal plane on the sample since the liquid lens area both focusing and steering the beam. The focal length of the liquid lenses may be adjusted as they scan to flatten out the focal plane. Alternately, it may be beneficial to add a lens or group of lenses between the liquid lens(es) and the sample to help flatten the focal plane and increase the telecentric nature of the scan.

Figure 8:
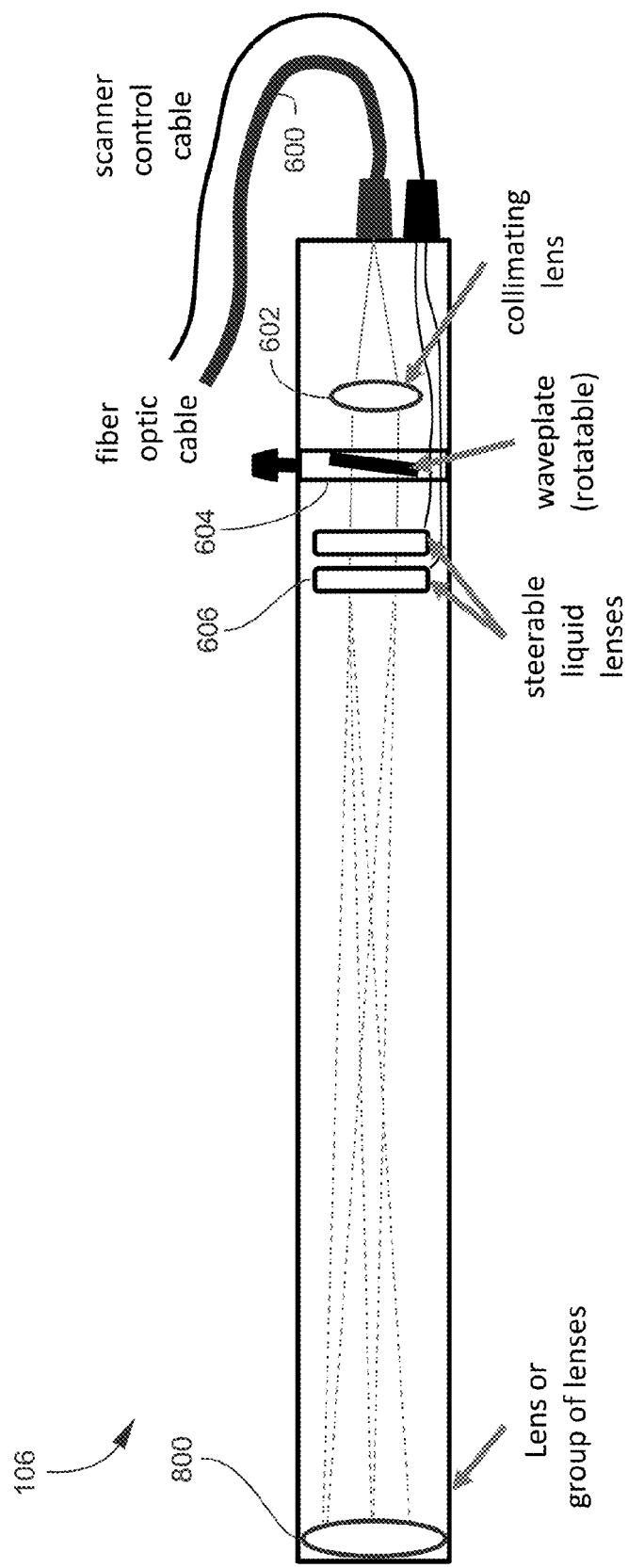
FIG. 8 is a diagram of a wand scanner in which a lens is added near the sample to help collimated the scanning beam as it moves across the sample in accordance with embodiment of the present subject matter.

FIG. 8 illustrates a diagram of a wand scanner in which a lens is added near the sample to help collimated the scanning beam as it moves across the sample in accordance with embodiment of the present subject matter. Particularly, FIG. 8 shows implementation of the wand scanner 106 with an additional lens set 800 of more telecentric sample scanning The lens set 800 may be a single lens or a group of lenses. The lens set 800 may be close to the sample or somewhere else in between the sample and the liquid lens.

Figure 9:
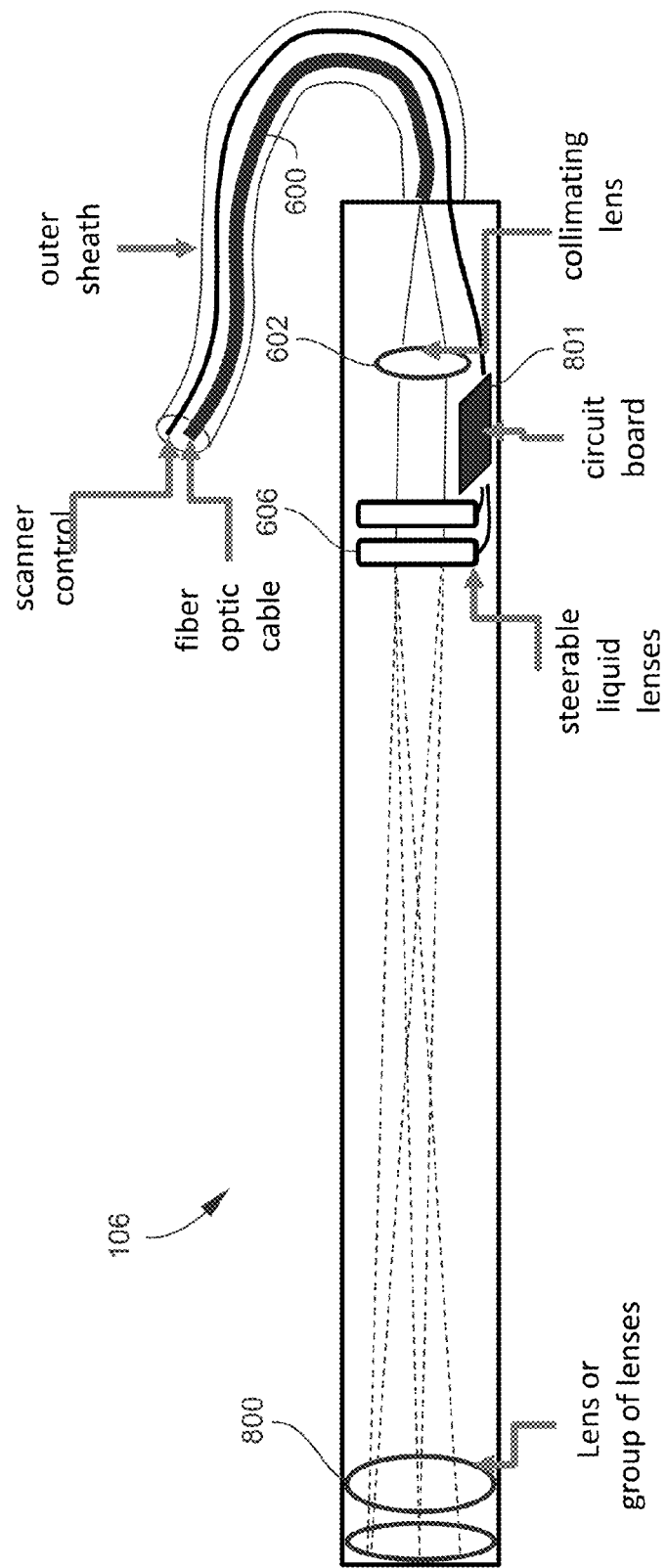
FIG. 9 is a diagram of an example wand scanner in which the polarization matching occurs in the OCT engine, via manual paddles, motorized paddles or other method.

FIG. 9 illustrates a diagram of an example wand scanner in which the polarization matching occurs in the OCT engine, via manual paddles, motorized paddles or other method. Referring to FIG. 9, the scanner 106 includes a circuit board for controlling the liquid lenses 606 inside the scanner 106. The steerable liquid lenses 606 may be driven by analog electrical signals which may be impacted by noise in cables. By placed a digital to an analog circuit board 801 in the scanner 106, the communication from the OCT engine to the scanner can be digital, which is much less sensitive to noise, and the analog drive signals can be generated in the wand scanner close to the liquid lenses.

Figure 10:
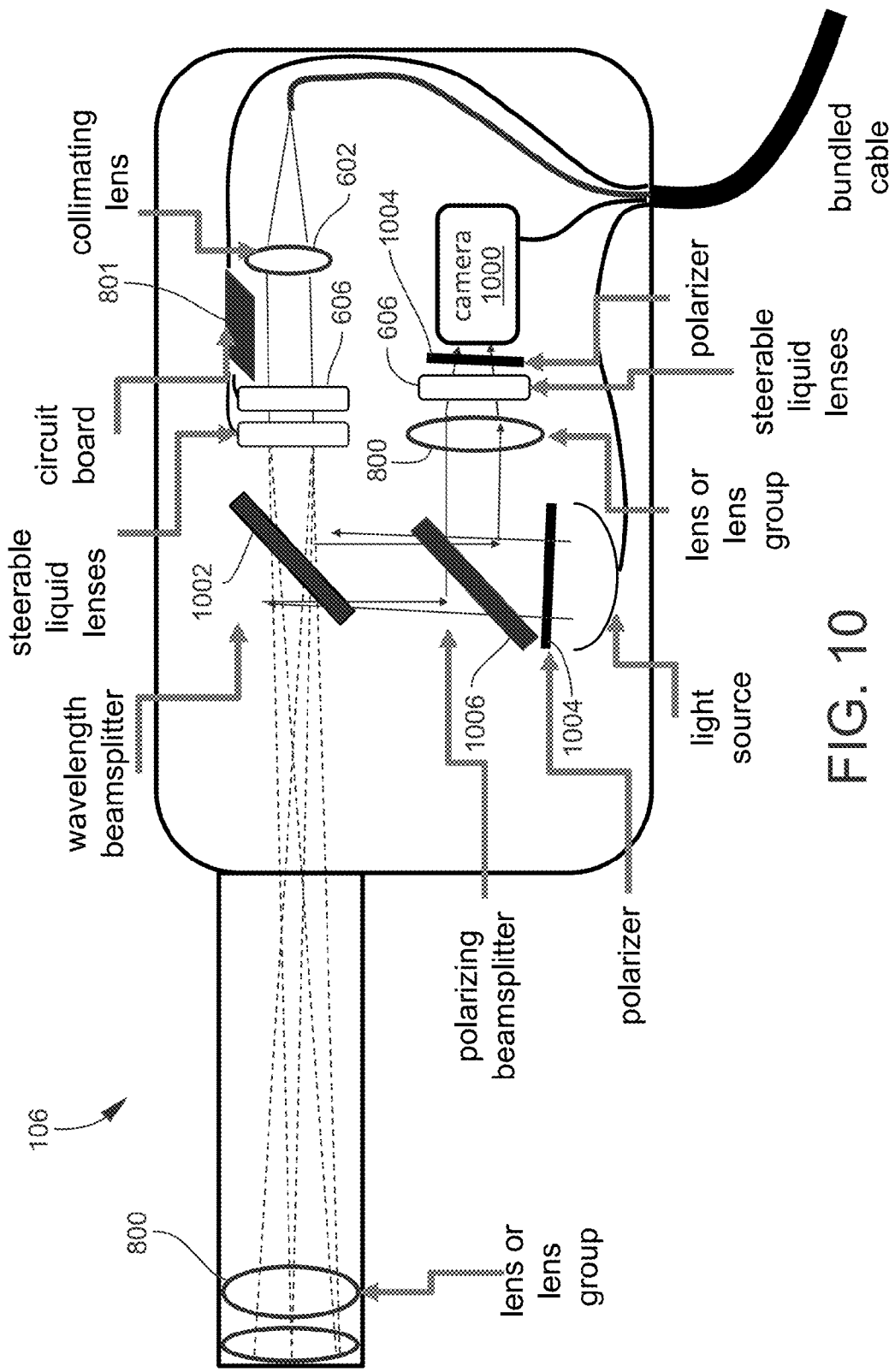
FIG. 10 is a diagram of an example wand scanner in which a camera has been added to the scanner to allow visual imaging of the sample while OCT images are being taken.

FIG. 10 illustrates a diagram of an example wand scanner 106 in which a camera 1000 has been added to the scanner to allow visual imaging of the sample while OCT images are being taken. Referring to FIG. 10, the scanner 106 includes a wavelength beamsplitter 1002 that is placed the OCT optical path; this beamsplitter may pass wavelengths longer than ~700 nm and reflect wavelengths shorter than ~700 nm. The visible wavelengths from ~400 to ~700 nm can be sent to the camera 1000 to provide a visual image of the sample. Suitable optics may be placed in beampath to the camera 1000 to focus the image onto the camera 1000. The liquid lens 606 can be used to allow adjustment of the focus. The liquid lens 606 may be a steerable liquid lens to allow adjustment of the focus and pointing of the imaging area. It may be necessary to illuminate the sample so that there is sufficient light to capture a visual image. This may be needed in the case of retinal imaging where there is very little ambient light available for imaging. In an example of illuminating the sample, crossed polarizers 1004 and a polarizing or non-polarizing beamsplitter 1006 may be included and configured for minimizing glare from optics or other areas. The glare from optics may be polarized the sample as the illumination light, while the retina and some other samples tend to depolarize the illuminated light when it is scattered back. The crossed polarizers 1004 may pass some light from the retina or other sample while suppressing most of the light scattered from optics or other areas.

Low Cost Spectrometer

In spectral domain OCT systems, the spectrometer can be the most expensive and sophisticated component. There are two critical components in the spectrometer, the line scan camera and the diffraction grating. In addition, the collimating and focusing optics and the mechanical package must be well designed to maintain optical alignment over time and temperature variations.

Figure 11:
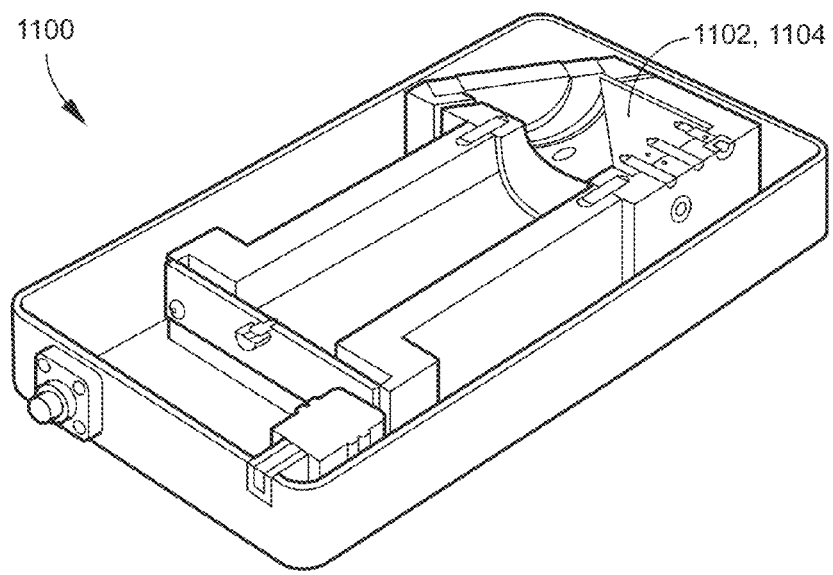
FIG. 11 is a cross-sectional perspective view of the interior of an example spectrometer in accordance with embodiments of the present subject matter.
Figure 12:
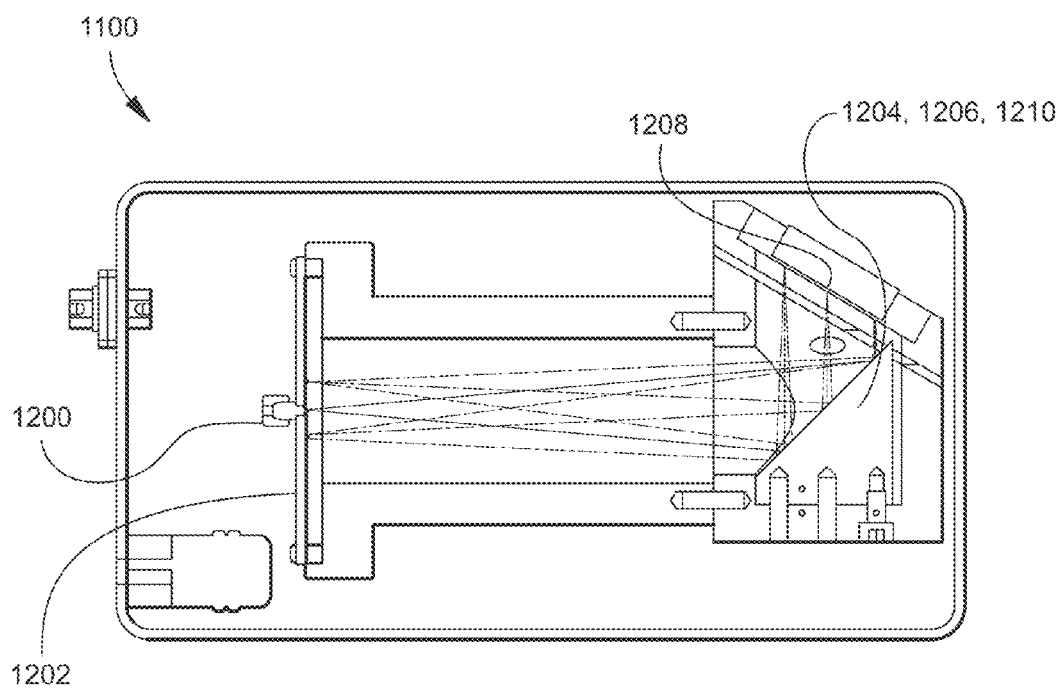
FIG. 12 is a cross-sectional top view of the spectrometer shown in FIG. 11.

FIGS. 11 and 12 illustrate a cross-sectional perspective view and a cross-sectional top view, respectively, of the interior of an example spectrometer 1100 in accordance with embodiments of the present subject matter. Referring to FIG. 11, the spectrometer 1100 may use a single off-axis parabolic mirror 1102. Particularly, the spectrometer 1100 may include and be configured to use an off axis parabolic reflector 1104 for both collimation and focusing of the light. The increased availability and reduced cost of single-point diamond turning has reduced the cost of parabolic reflectors, they are now less than $100 when purchased in small volumes (~10). A parabolic reflector can significantly reduce the chromatic and spherical aberrations that arise in lens systems with spherical surfaces. By using a 90 degree off-axis parabolic reflector 1104 to receive light from the entrance fiber of the spectrometer, the collimated beam comes out at a right angle, hits the grating and is diffracted back to the parabolic mirror. The parabolic reflector 1104 can focus the diffracted light to a horizontal line that sits below the input fiber, where the line scan array detector is located.

Referring to FIG. 12, the figure shows the ray trace of the light path in one example of the low cost spectrometer using a single parabolic mirror. Light enters on the left via the input ferrule 1200 in the middle of a printed circuit board 1202 and is collimated by the 90 degree off-axis parabolic mirror. Light is diffracted by the reflective grating and comes back to the off-axis parabolic mirror 1204 where is it then focused on the line scan array that is above or below the input ferrule. The input ferrule 1200 may be pointed slightly up or down so that the input light is slightly off axis relative to the grating or the grating itself may be tilted. The figure depicts the ray trace showing light path from input fiber to an off-axis parabolic reflector 1206 and then to a diffraction grating set 1208 at an angle of 30° relative to the incident angle of the light. Diffracted light is collected by off-axis parabolic and focuses onto line scan array below the input fiber. Off-axis parabolic mirrors with other angles may be used. Commonly available versions include 30 degrees, 45 degrees, and 60 degrees; additional angles are possible.

The focal length of a parabolic mirror 1210 and the line spacing of the grating will set the dispersion of the light across the line scan array. A focal length of approximately 100 millimeters and a grating with a line density of 1200 lines/millimeter can be configured into the spectrometer 1100. As an example, both of these optical elements are available from of the shelf sources such as Edmund Optics. The parabolic reflector 1206 can produce a small degree of coma for the collimated light that comes back from the grating which is angled relative to the central ray. Since one version of the array is only 8 millimeters long, the angular range over the 100 millimeter focal length is +/−2.3°, which generates a coma that is on the order of the pixel size of 8 microns. For this embodiment, 840 nm may be used as the central wavelength, given the availability of low cost SLD's in this spectral range. In SD-OCT, there is generally a trade-off between axial resolution and imaging depth of the OCT system. Greater axial resolution means less imaging depth due to the finite number of detection pixels. As a reasonable approximation, the axial resolution times half the number of pixels in the line scan array gives the imaging depth. This assumes that the light is dispersed fully across the wavelength range of the spectrometer. The low cost SLDs at 840 nm have a 3 dB bandwidth of ~45 nm. This can give an axial resolution of ~7 microns in air or 5 microns in tissue (resolution$_{tissue}$=resolution$_{air}$×n$_{tissue}$). The range of the spectrometer will be ~60 nm which give a per pixel resolution of 0.06 nm and an imaging depth of 3 millimeters in air or 2.2 millimeters in tissue.

For the line scan array, a suitable CCD or CMOS array may be used, such as the ELIS1024 (Enhanced Line-Scan Image Sensor 1024-pixel) from Dynamax Imaging. This array has 1024 pixels that are each 7.8 microns wide by 125 microns tall. The taller pixels can greatly relax the mechanical tolerance for aligning the spectrometer, which can significantly reduce cost in manufacturing and assembly. The maximum readout rate for the array is 30.0 MHz. A suitable circuit board may be used to interface with the linescan array. The board may have a 12 bit A/D converter, an FPGA for easy configuration, and a USB 2.0 interface chip for communication. The data rate may be limited by the USB 2.0 interface, but it can be expected to reach 20 Megasamples per second at 12 bit resolution, which corresponds to an A-scan rate of 20,000 per second, or up to 40 B-scan frames per second. Another suitable array is the Orion from Awaiba which comes in the 2K pixel version as well as a 1K and 4K pixel version.

In accordance with embodiments, the reflection grating may be replaced with a transmission grating and a mirror. By double passing a transmission grating, double the dispersion may be obtained, so for example instead of 1200 lp/mm reflection grating, a 600 lp/mm grating may be used. This may be advantageous in cases where the 600 lp/mm grating plus mirror are cheaper than a 1200 lp/mm grating. Transmission gratings may also have better diffraction over both polarizations which may be advantageous. Also, lower line density gratings may have better spectral response over a wider wavelength range which may be advantageous.

Low Cost Spectrometer with Loop Design

In accordance with embodiments, a spectrometer using a single off-axis parabolic mirror suffers from coma for light that does not come in on axis. For the collimating side, the optics are essentially perfect, but the light coming back from the diffraction grating is now spread over a range of angles corresponding to the different wavelengths. These off axis wavelengths can suffer from coma with larger angles experiencing more coma. For the case of a fairly small linescan array with a relatively narrow range of wavelengths, the coma may be small enough that the overall spectrometer performance is still acceptable.

For cases where the linescan array is larger and/or the wavelength range is larger, it may be advantageous to use a design where the off-axis parabolic mirror is only used for the collimating side of the spectrometer. For example, the linescan array used in the previous design had 1024 pixels at ~8 microns each, so the entire length of the array is ~8 millimeter. More typical for spectral domain OCT systems are linescan arrays with 2048 pixels or 4096 pixels. New arrays have pixel counts up to 8192 or larger. Pixel sizes may be 7 microns, 10 microns, 14 microns or some other size. A typical high resolution spectrometer may have 4096 pixels with a width of 10 microns each for a total length of 40 millimeters, which is 5 times as long as the linescan array described previously.

Likewise the spectral range for spectral domain OCT spectrometers is typically larger than the 60 nm described previously with 80 nm typical for retinal OCT systems with other systems having ranges up to 300 nanometers or more. These larger wavelength ranges may result in larger diffraction angle ranges since the diffraction angle range is proportional to wavelength ranges for a given line spacing of the diffraction grating.

Figure 13:
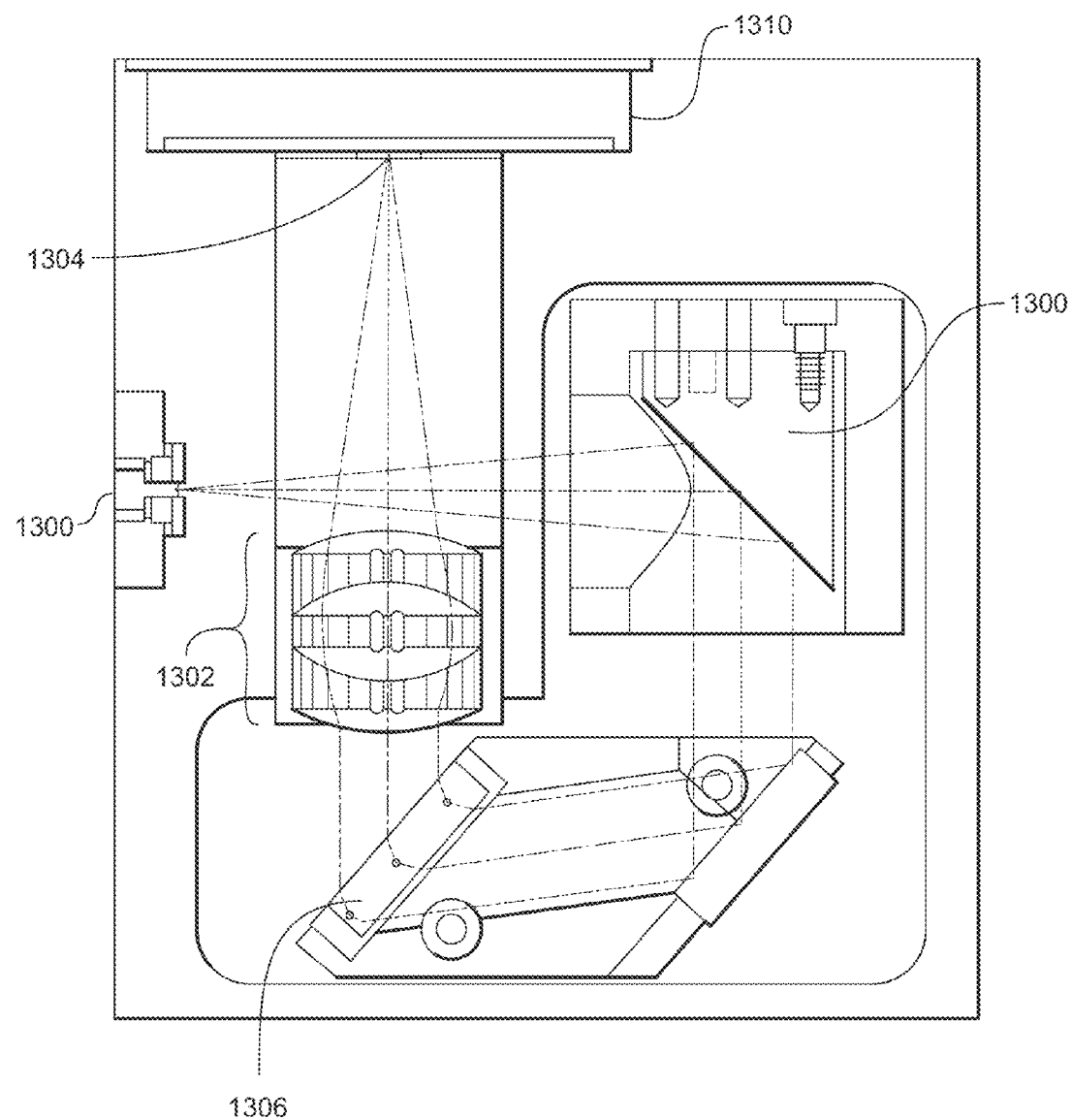
FIG. 13 is a schematic view of another example spectrometer with loop design in accordance with embodiments of the present subject matter.

FIG. 13 illustrates a schematic view of another example spectrometer with loop design in accordance with embodiments of the present subject matter. In this example, an off-axis parabolic mirror 1300 is used to collimate the light coming from the input aperture or fiber. After the collimating mirror, the light is reflected off of a mirror and then diffracted by a transmission diffraction grating. Once diffraction a lens group 1302 gathers and focuses the light indicident at a surface 1310 of a linescan array or a camera 1304. Since the off-axis parabolic mirror has very light chromatic or spherical aberrations, the light incident on the diffraction grating 1306 can be very well collimated. The diffraction grating 1306 and the focusing lens group 1302 may introduce some aberrations but the overall system should perform better than a spectrometer where the collimation is done by a lens group instead of the off-axis parabolic mirror. Furthermore the loop architecture has better mechanical stability and may be less sensitive to temperature variation. When combined with a tall pixel or area scan area, these spectrometers are more tolerant to changes in environment conditions compared to non-loop designs and spectrometers using short pixel linescan arrays.

The use of a mirror and then a grating allows the line spacing of the grating to be changed and only impact the mirror angle. The off-axis parabolic mirror and the focusing lens group can then remain the same for a wide range of spectrometer center wavelengths and wavelength ranges. For example in a wide bandwidth system that covers 300 nm, the line spacing of the grating may be fairly low, such at 600 lines per millimeter. In this case the incident angle may be close to 14 degrees (relative to the normal). The mirror may then be set to reflect the collimated light to the grating at a 14 degree angle of incidence. If the wavelength range is now reduced to 80 nm, the grating line spacing may need to be closer to 1800 lines per millimeter with a grating angle of incidence of about 46 degrees. The mirror would now be set at close to 45 degrees so that the grating angle of incidence is correct. For both of these cases, the other optics and the linescan array may be unchanged.

For these example of low cost spectrometers the center wavelengths and wavelength ranges discussed are just examples and can be changed as needed for the particular OCT system and application. Availability of light sources and sample response to various wavelengths often set the wavelength range used. For example retinal OCT is typically done with wavelengths below 900 nm, since longer wavelengths are attenuated by the water in the eye. Other common wavelength ranges that may be used include 1000 nm to 1100 nm, around 1310 nm, and around 1550 nm.

Low Cost OCT Based on Fiber Bundle and Imaging Spectrometer

In accordance with embodiments, a low cost OCT system may have the scanner removed completely and instead collect multiple A-scans in parallel using a fiber bundle. Instead of a single point being illuminated on the sample, a line is illuminated and then imaged onto the face of a fiber bundle. The bundle relays the light back to the OCT engine. This can be implemented using glass fiber bundles, but they are still relatively expensive. One solution is to provide a fiber bundle made of single mode optical fibers. As they become available, they can be used in this design. Current glass fiber bundles are typically multi-mode. If these have a step index between the core and the cladding, they may still be used. In particular, there are step index fiber bundles where there is a difference in the optical pathlength between the first (or fundamental mode) and the higher order modes through the fiber core. Provided the pathlength difference is sufficient, the OCT image can be generated by the interference of the fundamental mode and the reference arm light and the light from the higher order modes may either be rejected by the entrance slit to the spectrometer or show up as DC signal in the spectrum or show up as a secondary image offset in depth by the difference in the pathlengths. Typically, the difference in pathlengths may be larger than the imaging range of the spectrometer, but there are cases, such as the tissue detection application described later, where the pathlength difference does not need to be greater than the imaging range since a secondary image is not necessarily an issue if the user is just trying to detect a surface or see just into the surface by a distance that is less than the difference in the optical pathlengths between the fundamental mode and the next higher order mode.

Alternately, plastic fiber optic bundles may be utilized. Some standard configurations have 7,400 cores and 13,000 and range in size from 0.5 millimeters to 2.0 millimeters. Insertion loss ranges from 0.5 to 1.5 dB per meter. The cores are approximately 25 microns in size, so they are multi-mode over the wavelength ranges of interest (400 nm to ~2.0 microns). As these fiber bundles improve the insertion loss can come down and may ultimately approach glass fiber which can be a fraction of a dB per kilometer. The number of cores may also increase and the core size may decrease. This may increase the image size and decrease the multi-mode contributions of the fiber core.

Figure 14:
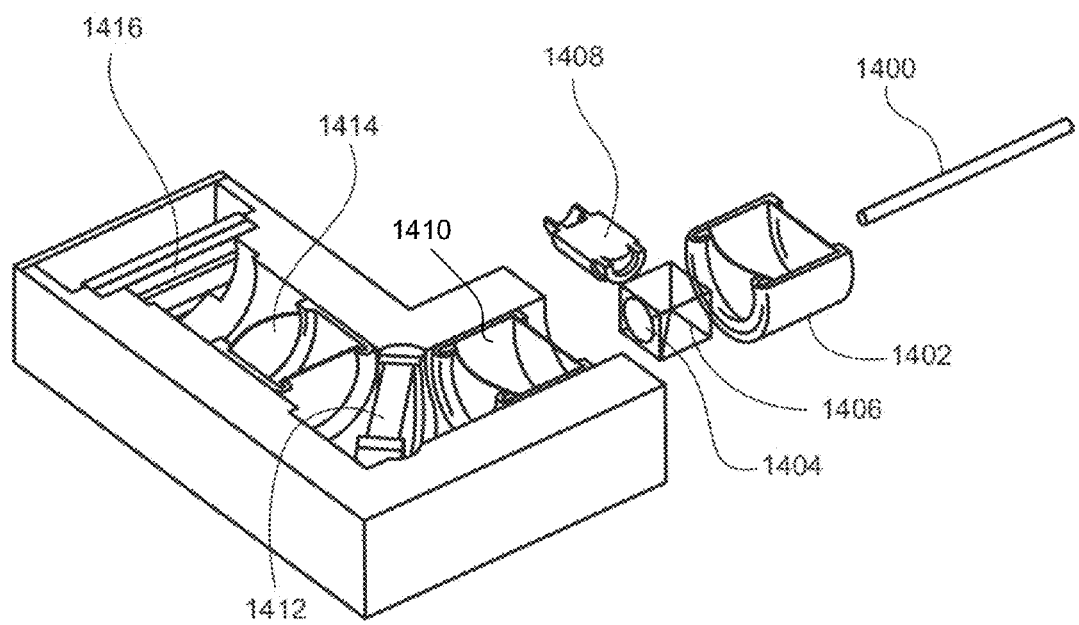
FIG. 14 is a perspective, cross-section and exploded view of another example spectrometer plus input optics for a spectral domain implementation of a fiber bundle OCT system in accordance with embodiments of the present subject matter.

There are multiple ways to implement the OCT engine for this embodiment; like previous Fourier domain OCT they broadly fall into spectral domain and swept source. FIG. 14 illustrates a perspective, cross-section and exploded view of another example spectrometer plus input optics for a spectral domain implementation of a fiber bundle OCT system in accordance with embodiments of the present subject matter. Fiber bundles 1400 may come in from the right. A lens set 1402 can image the bundle onto the entrance slit 1404 of the spectrometer, through the free space splitter 1406 where the reference arm light 1408 comes in. Once inside the spectrometer, there is a collimating lens set 1410, a transmission diffraction grating 1412, a focusing lens set 1414 and an area scan array 1416, shown here on a printed circuit board.

Figure 15:
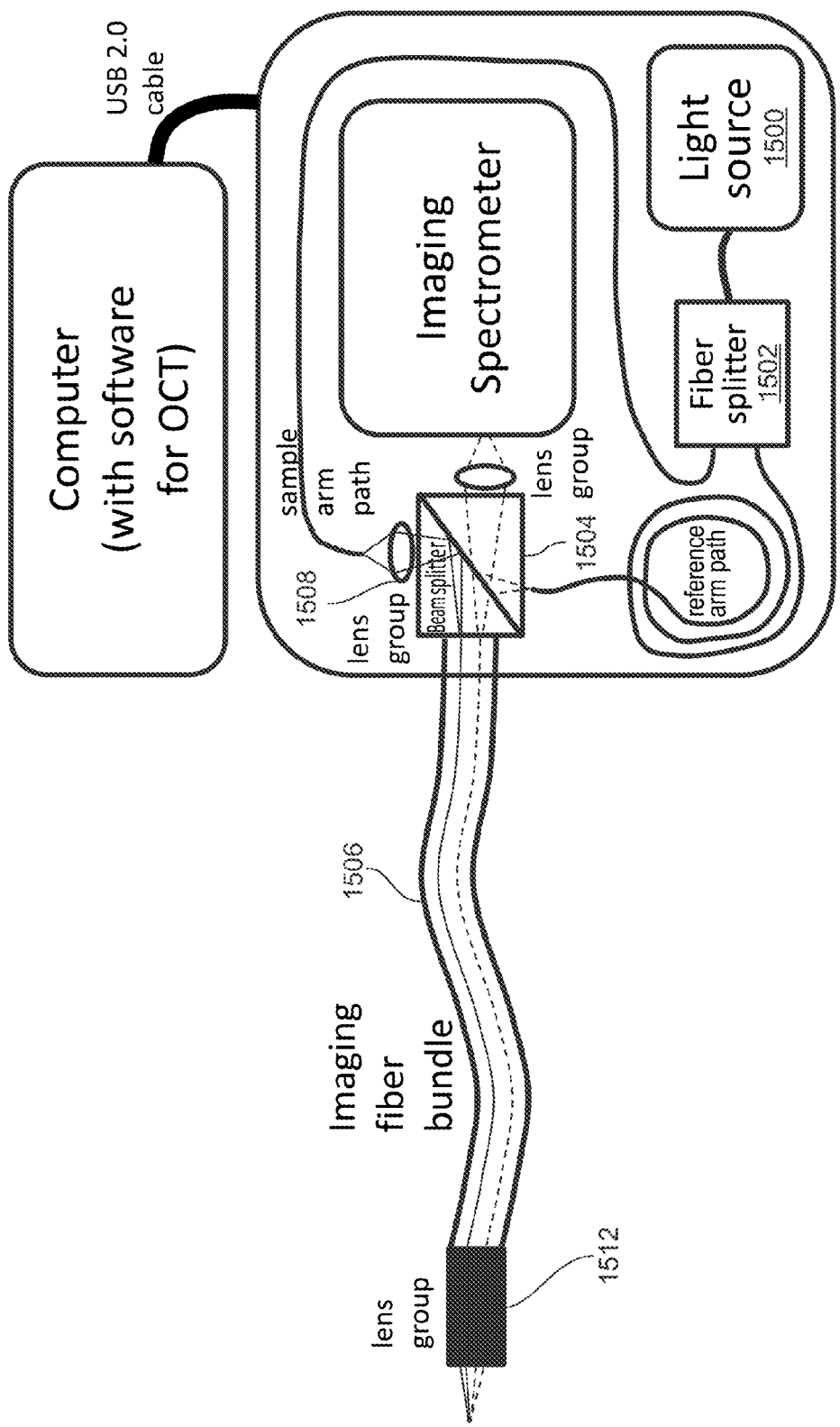
FIG. 15 is a block diagram for a version of the fiber bundle OCT system with the reference arm in the OCT engine.

A system block diagram is shown in FIG. 15, which illustrates a block diagram for a version of the fiber bundle OCT system with the reference arm in the OCT engine. A broadband light source 1500 may generate light and a fiber splitter 1502 may split the light into a sample path and a reference path. The sample path may go out through a beam splitter 1504, the fiber bundles 1506, a lens group 1508, and onto the sample. Scattered light comes back through the lens group 1508, the imaging fiber bundle 1506 and to the beam splitter 1504. This is then mixed or interfered with the light from the reference arm and imaged onto the entrance slit of the imaging spectrometer which is shown in further detail herein. Output from the spectrometer goes to the computer via a communication path such as USB 2.0, USB 3.0 or other means. Here, the broadband light source 1500 is used in a Mach-Zehnder interferometer configuration. The light from the source is split with part going to the sample and part remaining in the OCT engine. The light on the sample illuminates a line with scattered light then imaged onto the face of the fiber bundle 1506. A row (or several rows) of fibers near the middle of the bundle then carry the light from different spatial locations back to the OCT engine. Here, it interferes with light that remained in the OCT engine via free space beam splitter. From here, the light is incident on the slit of an imaging spectrometer. In this view, the spatial locations from the sample are mapped in the vertical direction and the wavelength range is mapped horizontally across the area scan array. Implementation show uses a lens group 1512 for collimation, a transmission diffraction grating and a focusing lens group. The detector may be any array scan array that may be, for example, a CMOS area scan array.

Alternately, these designs may be implemented using a swept source approach. Here the light source is a laser that sweeps its wavelength in time and on the detection end the spectrometer is replaced by a linescan array. The linescan array will make an acquisition for each wavelength that is desired during a sweep. The time sequence of linescans then provides the same information as the 2D area scan array in the spectral domain implementation.

Since the light source 1500 is spread across a line instead of focused at a single point, the optical power in each A-scan may be lower. In the reference arm path, this may not be an issue since there is typically excess optical power in the reference arm. The lower optical power may result in a lower signal to noise for the OCT image. This can be ameliorated to some degree by integrating for a longer time since an entire B-scan is being acquired at once. For example, an OCT system may acquire 20 B-scans in a second with 512 A-scans per B-scan. This can give an overall linescan rate of 10,000 per second or an integration time per A-scan of about 100 microseconds. In the fiber bundle, an approach to reach 20 B-scans per second may require 20 integrations of the array scan array so the integration time can be as large as 50 milliseconds, thereby making up for the lower power in a given A-scan. There is a limit to how effective this can be for samples that may be moving. Any motion can decrease the fringe contrast in the interferometer. In particular, biological systems move on time scales that start to wash out fringes for integration times longer than a few hundred microseconds. For static samples, this may be less of an issue.

Figure 16:
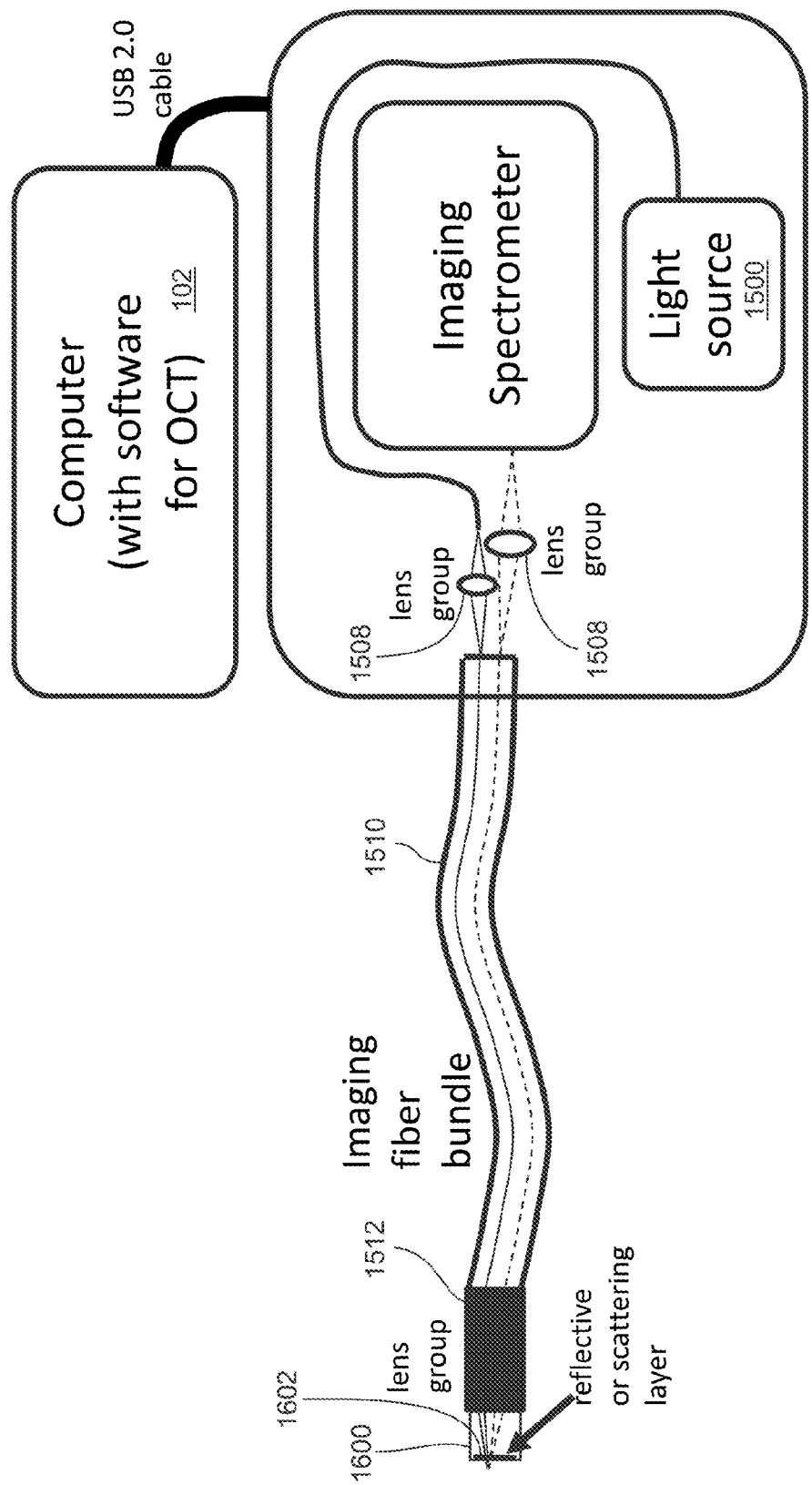
FIG. 16 is a block diagram for an example fiber bundle OCT system with the reference arm in fiber probe in accordance with embodiments of the present subject matter.

FIG. 16 illustrates a block diagram for an example fiber bundle OCT system with the reference arm in fiber probe in accordance with embodiments of the present subject matter. Referring to FIG. 16, light from the light source 1500 is imaged onto the fiber bundle 1510. In the fiber probe tip 1600, there is a layer 1602 that either reflects or scatters light and acts as the reference arm. The rest of the light may be incident on the sample and may scatter back. The interfered light is then imaged back onto the fiber bundle 1510 and transmitted to the OCT engine where another lens set images it onto the entrance slit of the imaging spectrometer as before. FIG. 16 shows another implementation where the interferometry all occurs in the in the tip 1600 of the fiber probe. Light from the broadband light source 1500 is imaged onto part of the fiber bundle 1510 and then transmitted to the distal end of the bundle. A lens group 1508 may focus the light onto the sample and onto a scattering or reflective layer 1602. The focus can be at or in the sample so the scattering layer may be out of focus. The scattering layer can be configured to scatter enough light to fill the dynamic range of the area scan array in the imaging spectrometer in the needed integration time. The scattered light may be minimized as much as possible to increase the amount of light on the sample and because the light scattered from the sample may have to pass through the scattering layer a second time and the signal can be reduced in proportion to the strength of scattering in the scattering layer. The scattering layer may be configured to scatter light over a narrow enough range to illuminate the fiber bundle even as the conditions in the fiber probe change do the changes in the orientation of the bundle or manufacturing variations in the fiber bundle or the probe tip optics.

It is noted that in all places where a lens group or set is mentioned, there are many ways to implement this function. The lens group or set may be one or more elements. These elements may be refractive (i.e., transmission) optics or reflective optics such as the off-axis parabolic mirror described earlier. In some case, it may be useful to use one or more GRIN lenses, particularly in the probe tip. Aspheric lenses may also be useful in some locations.

FIGS. 17A-17E illustrate diagrams of example probe tip geometries and optics in accordance with embodiments of the present subject matter. These different implementations can provide different scan patterns on the sample and may be driven by the particular application. More particularly, FIG. 17A shows a lens group (e.g., GRIN lens(es)) that provide a straight line image on the sample, directly ahead of the tip of the fiber probe. FIG. 17B shows a fisheye lens (or lenses) that gives a semicircle line on the sample and may see outside of the lateral range of the fiber probe. FIG. 17C shows a mirrored prism that directs the imaging line out the side of the bundle. The configuration of FIG. 17C may be used with rotation and/or pullback to generate a scan of a tube, blood vessel, or other tubelike structure. FIG. 17D shows a partial fisheye images both straight ahead and out to one side. Again may be used with rotation and/or pullback to generate a larger scan. FIG. 17E shows an axicon can be used to send the light out it multiple directions. The aixcon may have a mirrored surface (silver, gold, aluminum or other). Depending on the position of the center of the axicon relative to the center of the imaging line on the fiber bundle, the imaging line on the sample may be two lines on either side of the fiber bundle or an arc across the sample.

There are applications where the low cost and small size may be more important than the loss of signal to noise. For example there are applications where OCT may be used more as a ranging modality than an imaging modality. One of these in intubating patients—by using a fiber bundle that could be passed through the intubation tube it would be possible to see where the tube is relative to important landmarks in the airway. In this case imaging into the tissue as is often done with OCT is not as important as seeing where the surface of the tissue is relative to the intubation tube. The tissue surface will generate a very strong OCT signal even if the system signal to noise is not very good. This may be useful for such things as insuring the tube is in the airway and not the esophagus, avoiding the vocal cords, and insuring that the tube is not in the single bronchial tube, but instead stops in the airway before the bronchial tubes branch off The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and nonvolatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An optical coherence tomography (OCT) imaging system comprising:
   a scanner comprising a steerable lens that is fixed relative to an optical axis and configured to both focus and laterally scan a beam to obtain B-scans;
   a detector configured to convert the images to electrical signals; and
   a computing device comprising an OCT module configured to receive the electrical signals, to apply an OCT imaging technique, and to generate B-scans.

2. The OCT imaging system of claim 1, wherein the scanner is a handheld scanner.

3. The OCT imaging system of claim 1, wherein the scanner is configured to optically scan an object to obtain the images.

4. The OCT imaging system of claim 1, wherein the steerable lens comprises a liquid lens.

5. The OCT imaging system of claim 1, further comprising a spectrometer, a light source, and an interferometer.

6. The OCT imaging system of claim 5, wherein the interferometer comprises a fiber coupler.

7. The OCT imaging system of claim 5, wherein the spectrometer comprises an off axis parabolic reflector for collimation and focusing of light.

8. The OCT imaging system of claim 1, wherein the computing device comprises a display and a controller configured to control the display to output the imaging data.

9. The OCT imaging system of claim 1, further comprising a handheld device including the scanner.

10. The OCT imaging system of claim 1, wherein one of the scanner and the computing device is configured for polarization control.

11. The OCT imaging system of claim 1, further comprising a camera and a handheld device including the scanner, the camera being integrated into the handheld device.

12. The OCT imaging system of claim 1, wherein the computing device comprises a spectrometer including a single off-axis parabolic mirror, diffraction grating, lens set, and camera/linescan/area scan array.

13. The OCT imaging system of claim 12, wherein the spectrometer is a loop spectrometer.

14. The OCT imaging system of claim 1, further comprising:
   an opening to receive light;
   an off-axis parabolic mirror configured to collimate and focus the received light;

a grating configured to diffract the collimated and focused light and to reflect the light towards the off-axis parabolic mirror for focusing on a line scan array detector for imaging.

15. The OCT imaging system of claim 14, wherein the grating is a reflective grating.

16. The OCT imaging system of claim 14, wherein the grating comprises a transmission grating and a mirror.

17. The OCT imaging system of claim 1, further comprising an opening to receive light;
an off-axis parabolic mirror configured to collimate the received light;
a transmission diffraction grating to disperse the light; and
one or more lenses configured to focus the light onto a line scan array detector for imaging.

18. The OCT imaging system of claim 17, wherein the off-axis parabolic mirror, the transmission diffraction grating, and the one or more lenses are in a loop configuration, and wherein the OCT imaging system further comprises another mirror positioned between the off-axis parabolic mirror and the transmission diffraction grating.

19. The OCT imaging system of claim 17, wherein the transmission diffraction grating is a holographic transmission grating.

20. The OCT imaging system of claim 3, wherein the line scan array detector comprises pixels that are taller than the pixels are wide.

21. The OCT imaging system of claim 17, wherein the line scan array detector comprises a complementary metal-oxide semiconductor (CMOS) array detector.

* * * * *